(12) United States Patent
Fundament

(10) Patent No.: US 12,535,940 B2
(45) Date of Patent: Jan. 27, 2026

(54) SYSTEMS AND METHODS FOR PROVIDING MEDIA GUIDANCE IN RELATION TO PREVIOUSLY-VIEWED MEDIA ASSETS

(71) Applicant: Adeia Guides Inc., San Jose, CA (US)

(72) Inventor: Andrew Fundament, Arlington Heights, IL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/243,356

(22) Filed: Sep. 7, 2023

(65) Prior Publication Data
US 2024/0077994 A1    Mar. 7, 2024

Related U.S. Application Data

(63) Continuation of application No. 14/329,559, filed on Jul. 11, 2014, now abandoned.

(51) Int. Cl.
*G06F 3/04842* (2022.01)
*G06F 3/0482* (2013.01)
(Continued)

(52) U.S. Cl.
CPC ........ *G06F 3/04842* (2013.01); *G06F 3/0482* (2013.01); *G06F 3/04847* (2013.01);
(Continued)

(58) Field of Classification Search
CPC . G06F 3/04842; G06F 3/0482; G06F 3/04847
See application file for complete search history.

(56) References Cited

U.S. PATENT DOCUMENTS 7,890,599 B2 * 2/2011 Kalmanje .......... H04N 21/4325
725/138
7,890,628 B2 * 2/2011 Wilson .................. H04L 69/329
709/228

(Continued)

OTHER PUBLICATIONS

Tseytlin Yan, et al., "Method by which information is shared given a time, date, or location to enhance historical significance of web based content", Yan Tseytlin et al., "Method by which information is shared given a time, date, or location to enhance historical significance of web based content" 2014 (28 pages).

*Primary Examiner* — Benjamin Smith
(74) *Attorney, Agent, or Firm* — HALEY GUILIANO LLP

(57) ABSTRACT

The systems and methods disclosed herein provide media guidance in relation to previously-viewed media assets. A request from a user to access a source by which a media asset is currently being transmitted to a plurality of users is received. In response to accessing the source by which the media asset is currently being transmitted, a viewing history associated with the user is accessed to determine whether the media asset has previously been viewed by the user. Responsive to determining that the media asset has previously been viewed by the user, a first play position, at which the user previously stopped viewing the media asset is identified. A transport bar is generated for display by the systems and methods, including a first time indicator corresponding to the first play position, and a second time indicator corresponding to a portion of the media asset currently being transmitted by the source.

18 Claims, 8 Drawing Sheets

(51) Int. Cl.
  *G06F 3/04847* (2022.01)
  *H04N 21/2187* (2011.01)
  *H04N 21/433* (2011.01)
  *H04N 21/442* (2011.01)
  *H04N 21/472* (2011.01)
  *H04N 21/475* (2011.01)
  *H04N 21/845* (2011.01)

(52) U.S. Cl.
  CPC ..... *H04N 21/2187* (2013.01); *H04N 21/4333* (2013.01); *H04N 21/44226* (2020.08); *H04N 21/47214* (2013.01); *H04N 21/47217* (2013.01); *H04N 21/4751* (2013.01); *H04N 21/8455* (2013.01)

(56) References Cited

U.S. PATENT DOCUMENTS

| | | | |
|---|---|---|---|
| 8,127,168 B2* | 2/2012 | Maeda | G06F 9/4856 713/502 |
| 8,219,134 B2* | 7/2012 | Maharajh | G06Q 30/0267 455/66.1 |
| 8,365,235 B2* | 1/2013 | Hunt | G06F 3/04855 725/89 |
| 8,671,021 B2* | 3/2014 | Maharajh | G06F 16/7867 705/14.51 |
| 8,706,841 B2* | 4/2014 | Gordon | H04N 21/25891 709/219 |
| 8,793,582 B2* | 7/2014 | Johansson | G06F 3/167 715/730 |
| 8,909,776 B2* | 12/2014 | Kalmanje | H04N 21/21805 725/138 |
| 8,984,549 B2* | 3/2015 | Del Sordo | H04N 21/4331 725/24 |
| 9,043,850 B2* | 5/2015 | Hoffert | H04L 65/60 725/43 |
| 9,063,640 B2* | 6/2015 | Hoffert | G06F 16/743 |
| 9,066,048 B2* | 6/2015 | Hoffert | G06F 3/017 |
| 9,088,827 B2* | 7/2015 | Craner | H04N 21/26616 |
| 9,124,650 B2* | 9/2015 | Maharajh | G06Q 50/60 |
| 9,264,776 B2* | 2/2016 | Jung | H04N 21/47217 |
| 9,432,629 B2* | 8/2016 | Olsen, Jr. | H04N 21/47202 |
| 9,456,130 B2* | 9/2016 | Kim | H04N 21/4122 |
| 9,479,739 B2* | 10/2016 | Lindquist | H04N 21/6125 |
| 9,575,642 B1* | 2/2017 | Minkin | G06F 16/438 |
| 9,635,409 B2* | 4/2017 | Atake | H04N 21/41407 |
| 9,686,577 B2 | 6/2017 | Tseng et al. | |
| 9,715,899 B2* | 7/2017 | Guckenberger | G06F 40/109 |
| 9,774,917 B1* | 9/2017 | Christie | H04N 21/4622 |
| 9,778,897 B2* | 10/2017 | Millington | H04L 65/1094 |
| 9,792,010 B2* | 10/2017 | Hoffert | H04N 21/482 |
| 9,961,374 B2* | 5/2018 | Kalmanje | H04N 21/231 |
| 9,979,995 B2* | 5/2018 | Tobin | H04N 21/44226 |
| 10,097,883 B1* | 10/2018 | Rasool | H04N 21/42215 |
| 10,218,760 B2 | 2/2019 | Vishnia et al. | |
| 10,659,851 B2* | 5/2020 | Lister | H04N 21/6587 |
| 10,701,407 B2* | 6/2020 | Kalmanje | G11B 27/10 |
| 10,856,038 B2* | 12/2020 | Bhooi | H04N 21/458 |
| 11,128,895 B2* | 9/2021 | Kalmanje | H04N 21/47217 |
| 2005/0076127 A1* | 4/2005 | Wilson | H04L 67/51 709/227 |
| 2006/0045472 A1 | 3/2006 | Poslinski | |
| 2006/0267995 A1 | 11/2006 | Radloff et al. | |
| 2008/0063361 A1 | 3/2008 | Saito | |
| 2008/0126919 A1* | 5/2008 | Uskali | H04N 21/8455 707/E17.009 |
| 2008/0195664 A1* | 8/2008 | Maharajh | G06F 16/487 |
| 2008/0201386 A1* | 8/2008 | Maharajh | G06Q 30/0261 |
| 2009/0158326 A1* | 6/2009 | Hunt | H04N 5/783 725/38 |
| 2009/0279872 A1* | 11/2009 | Umemoto | H04N 21/43637 386/326 |
| 2009/0310937 A1* | 12/2009 | Ellis | H04N 21/4331 386/239 |
| 2010/0027966 A1* | 2/2010 | Harrang | H04N 21/44004 725/116 |
| 2010/0043040 A1* | 2/2010 | Olsen, Jr. | H04N 21/44012 725/110 |
| 2010/0229168 A1* | 9/2010 | Maeda | G06F 9/4856 718/1 |
| 2011/0225417 A1* | 9/2011 | Maharajh | H04L 65/752 713/150 |
| 2011/0286721 A1* | 11/2011 | Craner | H04N 21/4331 386/343 |
| 2012/0054045 A1 | 3/2012 | Beining et al. | |
| 2012/0072543 A1* | 3/2012 | Kalmanje | H04N 21/4333 709/219 |
| 2012/0084454 A1* | 4/2012 | Lindquist | H04L 65/65 709/231 |
| 2012/0254917 A1 | 10/2012 | Burkitt et al. | |
| 2012/0328261 A1* | 12/2012 | Matsunaga | G11B 27/105 386/230 |
| 2013/0047083 A1 | 2/2013 | Sansom et al. | |
| 2013/0081078 A1* | 3/2013 | Del Sordo | H04N 21/812 725/34 |
| 2013/0110978 A1* | 5/2013 | Gordon | H04N 21/4788 709/218 |
| 2013/0166580 A1* | 6/2013 | Maharajh | G06F 16/437 707/758 |
| 2013/0176415 A1* | 7/2013 | Kim | H04N 21/4821 348/78 |
| 2013/0305278 A1* | 11/2013 | Gordon | H04N 21/2665 725/32 |
| 2013/0311575 A1* | 11/2013 | Woods | H04N 21/8456 709/206 |
| 2013/0347044 A1* | 12/2013 | Lee | H04N 21/2541 725/88 |
| 2014/0053196 A1 | 2/2014 | Selim | |
| 2014/0059432 A1* | 2/2014 | Johansson | G06F 16/70 715/719 |
| 2014/0089962 A1* | 3/2014 | Ogawa | H04N 13/167 725/29 |
| 2014/0109127 A1* | 4/2014 | Kalmanje | G11B 27/10 725/115 |
| 2014/0123182 A1 | 5/2014 | Lee et al. | |
| 2014/0181667 A1* | 6/2014 | Chen | H04N 21/84 715/716 |
| 2014/0186010 A1* | 7/2014 | Guckenberger | G11B 27/11 386/248 |
| 2014/0215514 A1* | 7/2014 | Jung | H04N 21/4622 725/38 |
| 2014/0372888 A1* | 12/2014 | Hoffert | H04N 21/42224 709/217 |
| 2014/0373037 A1 | 12/2014 | Craner | |
| 2014/0373057 A1* | 12/2014 | Hoffert | H04N 21/4312 725/100 |
| 2015/0095937 A1* | 4/2015 | Tobin | H04N 21/4756 725/32 |
| 2015/0100885 A1 | 4/2015 | Riley et al. | |
| 2015/0113407 A1* | 4/2015 | Hoffert | H04N 21/482 715/720 |
| 2015/0181301 A1* | 6/2015 | Bloch | H04N 21/4532 725/41 |
| 2015/0193036 A1 | 7/2015 | Yoo et al. | |
| 2015/0199116 A1 | 7/2015 | Bloch et al. | |
| 2015/0358666 A1* | 12/2015 | Atake | H04N 21/43615 725/88 |
| 2015/0370466 A1* | 12/2015 | Hoffert | G06F 16/743 715/720 |
| 2015/0382079 A1* | 12/2015 | Lister | H04N 5/783 725/38 |
| 2017/0070779 A1 | 3/2017 | Kim et al. | |
| 2018/0192150 A1 | 7/2018 | Schmidt et al. | |
| 2019/0007728 A1* | 1/2019 | Rasool | H04N 21/4384 |
| 2019/0075333 A1* | 3/2019 | Kalmanje | H04N 21/21805 |
| 2019/0200070 A1* | 6/2019 | Raikar | H04N 21/43615 |
| 2019/0200090 A1 | 6/2019 | Merced et al. | |
| 2020/0068250 A1* | 2/2020 | Bhooi | H04N 21/4334 |
| 2020/0351526 A1* | 11/2020 | Kalmanje | H04N 21/2387 |

* cited by examiner

700

| Program Name | Episode | Last View Time | User ID |
|---|---|---|---|
| The Sopranos | Season 2, Ep 1 | 5:20 | John |
| Breaking Bad | Season 3, Ep 4 | 15:39 | Sally |
| Gone with the Wind | n/a | 01:32 | Bob |
| ⋮ | ⋮ | ⋮ | ⋮ |

FIG. 7

SYSTEMS AND METHODS FOR PROVIDING MEDIA GUIDANCE IN RELATION TO PREVIOUSLY-VIEWED MEDIA ASSETS

CROSS-REFERENCE TO RELATED APPLICATION

This application is a continuation of U.S. patent application Ser. No. 14/329,559, filed Jul. 11, 2014, the disclosure of which is incorporated by reference in its entirety.

BACKGROUND OF THE DISCLOSURE

Users who have seen a media asset in part often wish to resume watching the partially-viewed media asset from the position at which they previously stopped viewing the media asset. While conventional systems may indicate whether a media asset as a whole has previously been watched, these systems do not allow a user to pinpoint the exact location at which the user previously stopped watching. Accordingly, based on this coarse-grained approach, users wishing to identify at what position they have previously left off watching a media asset lack effective mechanisms for identifying the last-seen play position and are not able to automatically resume watching the media asset from that position.

SUMMARY

Accordingly, systems and methods are described herein for providing media guidance in relation to previously-viewed media assets by visualizing segments of a media asset that have previously been viewed by the user, and positions at which the user previously stopped watching. The systems and methods further enable users to execute or activate media guidance functions in relation to the position or positions at which they previously stopped watching (e.g., by resuming to watch the media asset from that position or by setting a reminder to tune back to a channel transmitting the media asset when a broadcast of the media asset reaches the position at which the user previously stopped watching).

For example, a user may be flipping through channels in order to identify media assets to watch. When the user changes channels, the systems and methods identify the specific media asset that is currently being transmitted on the channel (e.g., an episode of a TV show). In response to determining the specific media asset, the systems and methods may access a viewing history to determine if the user has watched or otherwise accessed the media asset before and, if so, the position at which the user previously left off watching the media asset. If the media asset has previously been watched or accessed, an indication of that position is provided together with another indication of the current play position. The user is further able to execute or activate various functions in relation to the position at which the user previously stopped watching the media asset, such as resuming to watch the media asset from the last watched position.

In some aspects, in response to receiving a request from the user to access a media source (e.g., by tuning to a broadcast channel), the systems and methods access a viewing history associated with the user to determine whether a media asset (e.g., an episode of a TV show) currently being transmitted by the media source (e.g., the broadcast channel) has previously been viewed by the user. The viewing history may be accessed automatically in response to accessing the media source, without requiring further input from a user. The viewing history may be stored locally or remotely and may specifically identify previous access times in relation to a specific user and/or a group of users. The viewing history may also specifically identify the media asset (e.g., the episode of the TV show) based on its title, its season/episode number, or based on any other suitable identifier or metadata.

For example, a user may tune to a broadcast channel on which a particular episode of a TV series is being shown (e.g., an episode of the show "The Sopranos"). In response to tuning to the broadcast channel currently airing the show, the systems and methods may determine an identifier associated with the show (e.g., the show's name and the season and episode number of the "The Sopranos" episode). For example, a media guidance database may be accessed to retrieve a program listing corresponding to the broadcast channel at the current time. The systems and methods may then access a viewing history to determine whether an entry exists in the viewing history associated with the determined identifier. If such an entry exists, the systems and methods may retrieve the entry in the viewing history and present the user with an indicator of a play position at which the user previously stopped viewing the media asset (e.g., the user previously stopped viewing the media asset ten minutes into the episode).

In some aspects, the systems and methods visualize the position at which a user has previously stopped viewing the media asset (e.g., an episode of a TV show) by generating for display a transport bar that includes an indicator of a play position at which the user previously left off. The transport bar may further include another indicator that corresponds to a current play position (e.g., the current broadcast position), therefore enabling a user to determine whether the current play position is before or after the position at which the user previously stopped viewing the media asset. This visualization allows users to determine whether to continue watching the media asset, come back to the media asset at a later time, or perform other suitable media guidance functions in relation to the media asset. For example, a user accessing an episode of "The Sopranos" on a broadcast channel may be presented with a transport bar that shows a current play position (e.g., 5 mins into the episode). The user may have previously viewed a larger fraction of the episode (e.g., the user previously watched the first 25 mins of the episode but was interrupted). In accordance with this example, the transport bar may include two indicators, one indication that marks the current play position of 5 mins into the episode, and another indicator at 25 mins marking the position at which the user previously stopped viewing the episode. Provided with this information, the user is able to make a more informed determination of whether to continue watching the broadcast of the specific episode, thus watching the next 20 mins of previously accessed content again, or whether to avoid watching the previously accessed content by invoking one of the media guidance functions discussed above and below.

In other aspects, it may be the case that the user accesses the source (e.g., by tuning to a broadcast channel) transmitting the media asset (e.g., an episode of a TV show) at a time that is after the position at which the user previously stopped viewing the media asset. For example, the current play position of the "The Sopranos" episode may be at 25 mins and the user previously viewed only the first 5 mins of the episode. Similar to the aforementioned scenario, the transport bar may visualize both indicators, thereby enabling the user to make a more informed decision as to whether to continue watching the episode, or whether to execute one of the media guidance functions discussed above or below. For example, the user may decide to keep watching the episode from the current play position, thus missing out on the segment of the media asset between the position at which the user previously stopped viewing the media asset and the current play position (e.g., the current broadcast position). Alternatively, the user may decide to invoke a media guidance function to automatically record the missed segment of the media asset when that episode is being re-aired, or by accessing the media asset on-demand.

In some aspects, the systems and methods may determine that the current play position (e.g., the current broadcast position) of the media asset is before the position at which the user previously stopped viewing the media asset. In response to making this determination, the systems and methods may receive a selection from the user to monitor when the current play position (e.g., the current broadcast position) reaches the position at which the user previously stopped viewing the media asset, and to execute a function once the current play position reaches the position at which the user previously stopped viewing the media asset. Executing the function may include alerting the user that the current play position (e.g., the current broadcast position) has reached the position at which the user previously stopped viewing the media asset, automatically switching to the source transmitting the media asset (e.g., automatically tuning to the broadcast channel) once the current play position has reached the position at which the user previously stopped viewing the media asset (e.g., assuming the user has since tuned away to watch other content), or recording the media asset from the position at which the user has previously stopped viewing the media asset.

In some aspects, the systems and methods may determine that the current play position (e.g., the current broadcast position) of the media asset (e.g., an episode of a TV show) is after the position at which the user previously stopped viewing the media asset. In response to making this determination, the systems and methods may receive a selection from the user to display the media asset either from the beginning or from the position at which the user has previously stopped viewing the media asset. For example, a user tuning to an episode of the show "The Sopranos" may be shown a transport bar that indicates that the user has previously viewed the episode and stopped watching 10 mins into the episode. The current play position (e.g., the current broadcast position) may be 20 mins into the episode, and thus the user would miss a portion of the episode if the user continued watching from the current play position (e.g., the current broadcast position). In response to this determination, the systems and methods may enable the user to display the episode either from the beginning or from the position at which the user previously stopped viewing the episode, assuming that the episode has been stored or buffered and is thus available for retrieval. Alternatively, the systems and methods may access a media asset database in order to retrieve the episode on demand.

In some aspects, the viewing history may include viewing information for one or more users, and viewing information may be retrieved from the viewing history based on a user identifier. Specifically, the systems and methods may determine an identifier associated with the user currently accessing content and use the user identifier in combination with an identifier of the media asset to determine if the user has previously viewed the media asset and, if so, at what position the user previously stopped viewing the media asset. In some embodiments multiple users may be accessing content at the same time (e.g., a family watching television together), in which case the viewing history may be accessed multiple times, for each of the multiple users. If the entries retrieved from the viewing history differ among the users, multiple indicators may be shown on the transport bar in order to visualize each of the positions at which different users have previously stopped viewing the media asset.

In some aspects, in response to the visual indication of having seen the media asset previously, the system and methods may receive a user selection to access the media asset on-demand. For example, a user who notices that he or she has previously seen the beginning of an episode of the show "The Sopranos" but would miss a portion of the episode if he or she resumed watching from the current broadcast position (e.g., if the current play position is after the position at which the user previously stopped viewing the media asset) may decide that he or she would like to access the episode on-demand. In response to such a user selection, the systems and methods may access the episode on-demand from a content source. In some embodiments, the systems and methods may automatically determine if the episode is available on-demand, and may show the user the cost of purchasing the episode, if payment is required.

In some aspects, the systems and methods may visualize the current play position (e.g., the current broadcast position) and the position at which the user previously stopped viewing the media asset using a transport bar that is overlaid on top of the portion of the media asset currently being generated for display. In addition to generating for display the transport bar, other visualization techniques may be used to indicate the aforementioned play position (e.g., the current broadcast position). In addition, listings of one or more media guidance functions, which may be executed in relation to the previously-viewed media asset, may be generated for display, thereby enabling the user to determine easily what types of media guidance functions are available to be executed. Media guidance functions that are not available to be executed may be grayed-out, whereas media guidance functions that are available to be executed may be highlighted.

It should be noted that the systems and methods described above may be combined with, applied to, or used in accordance with, other systems, methods, or apparatuses discussed both above and below.

BRIEF DESCRIPTION OF THE DRAWINGS

The above and other objects and advantages of the disclosure will be apparent under consideration of the following detailed description, taken in conjunction with the accompanying drawings, in which like reference characters refer to like parts throughout, and in which:

FIG. 7 shows an illustrative viewing history that stores play positions at which a user previously stopped viewing a media asset, in accordance with some embodiments of the disclosure;

DETAILED DESCRIPTION OF THE DRAWINGS

Figure 1:
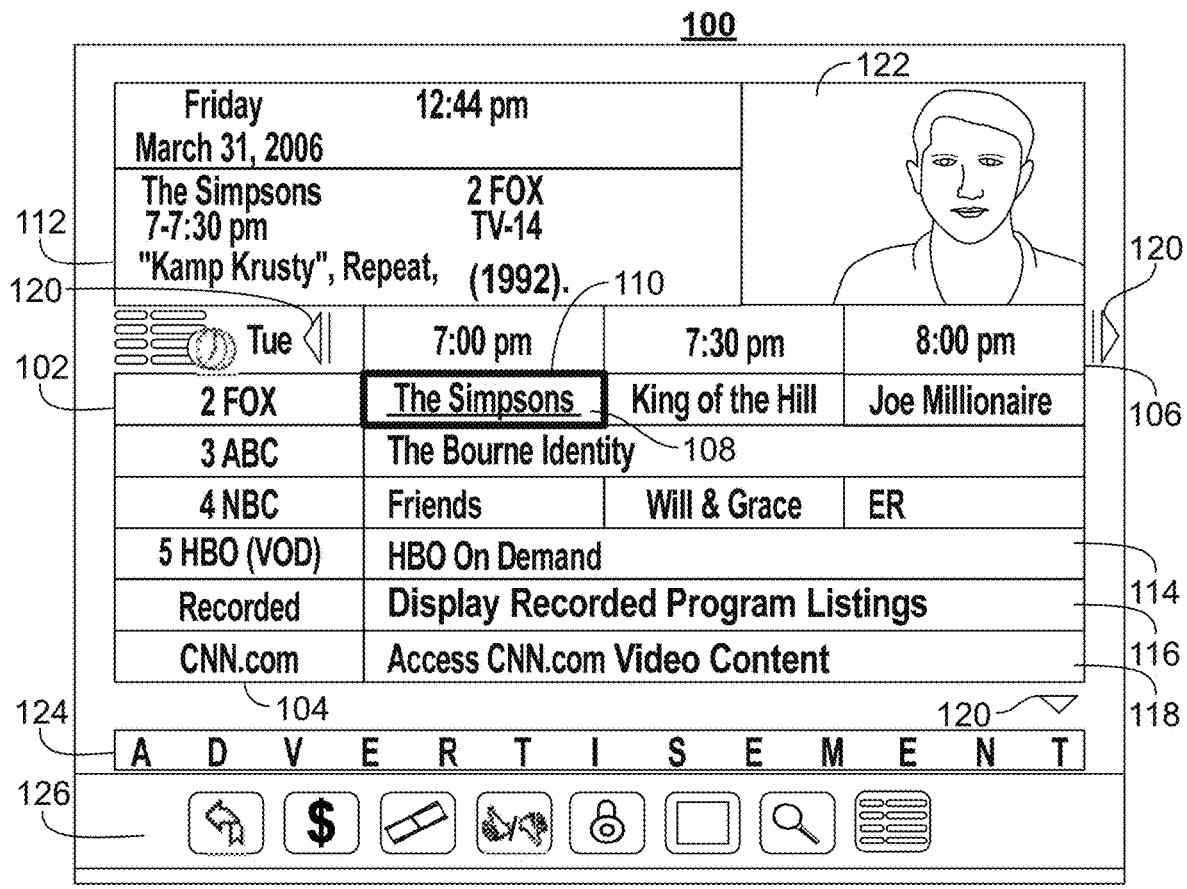
FIGS. 1 and 2 show illustrative display screens that may be used to provide media guidance application listings in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of a media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, media guidance data may further include viewing data, such as listings of previously-viewed or previously-accessed media assets, listings of the positions at which the viewing of a media asset was previously stopped, or listings of days and times at which a media asset was previously accessed. The listings may include one or more user or group identifiers to associate the viewing information with one or more users.

FIGS. 1-4 show illustrative display screens that may be used to provide media guidance data. The display screens shown in FIGS. 1-4 may be implemented on any suitable user equipment device or platform. While the displays of FIGS. 1-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Program listing 108 in grid 102 may be graphically accentuated to indicate whether the program that corresponds to program listing 108 has previously been viewed by the user. For example, if the program has previously been watched by the user in its entirety, an icon or text may be added to program listing 108. Alternatively or additionally, program listing 108 may be graphically accentuated by using a different color or shading to distinguish it from other program listings that have not been accessed by the user. Moreover, if a program has previously been accessed by the user but not watched in its entirety, program listing 108 may provide a graphical indication of the position at which the user previously stopped viewing the program. For example, if the first half of the program has previously been viewed by the user, then the first half of program listing 108 may be colored or shaded differently from the remainder of the program listing, in order to indicate to the user that only the first half of the program has previously been accessed. This enables the user to prioritize watching a program that has not yet been viewed in its entirety, e.g., because the user was interrupted while watching the program.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some aspects, viewing data about media assets accessed by the user and positions at which the user previously stopped viewing the media asset may be stored locally or remotely. For example, to provide a user with a unified guidance application experience across the user's different user equipment devices, some or all of the viewing data may be stored as part of a user's profile.

Figure 2:
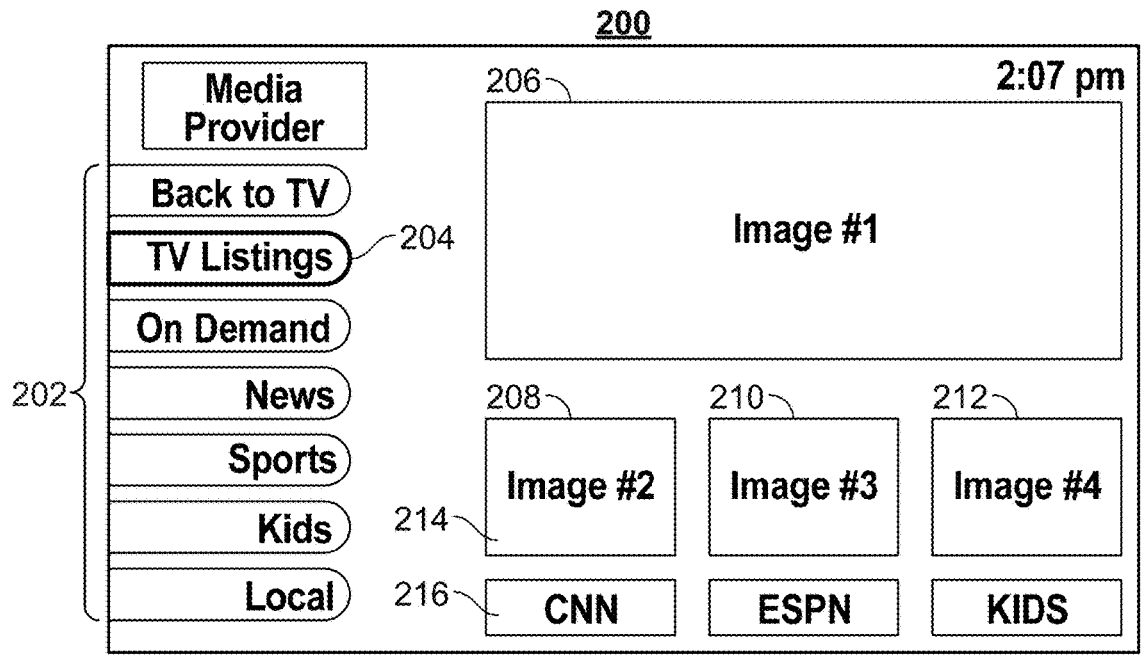

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety. For example, in one aspect, listings may be graphically accentuated according to whether they have previously been viewed by the user.

Figure 3:
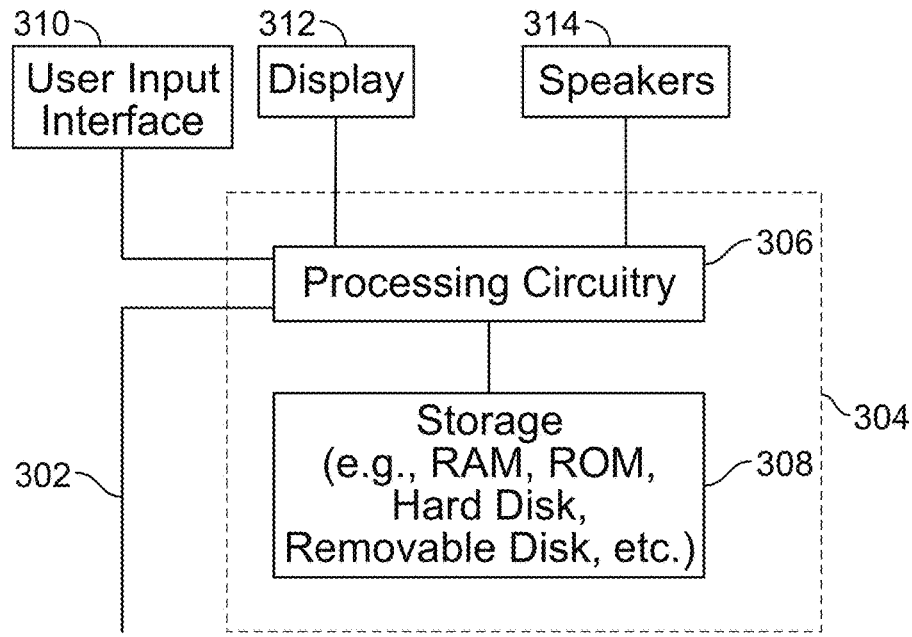
FIG. 3 shows an illustrative user equipment device in accordance with another embodiment of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
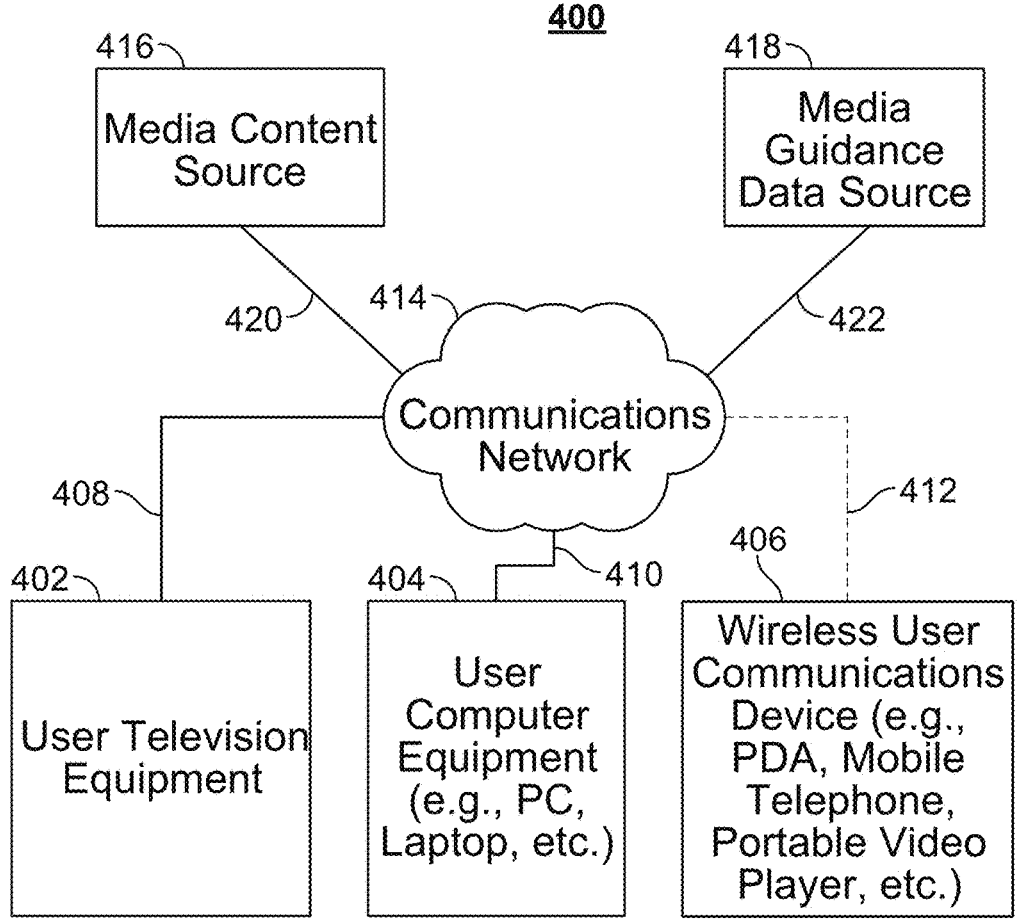
FIG. 4 is a diagram of an illustrative cross-platform interactive media system in accordance with another embodiment of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. In some embodiments, the second screen device is configured to show whether a media asset has previously been viewed by the user and, if so, the position at which the user previously stopped viewing the media asset. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc. In some aspects, the media guidance data may further include information about whether a user has previously accessed a media asset and, if so, whether the media asset was watched in its entirety. If the media asset was accessed but not watched in its entirety, the media guidance data may include the position at which the user previously stopped viewing the media asset. The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
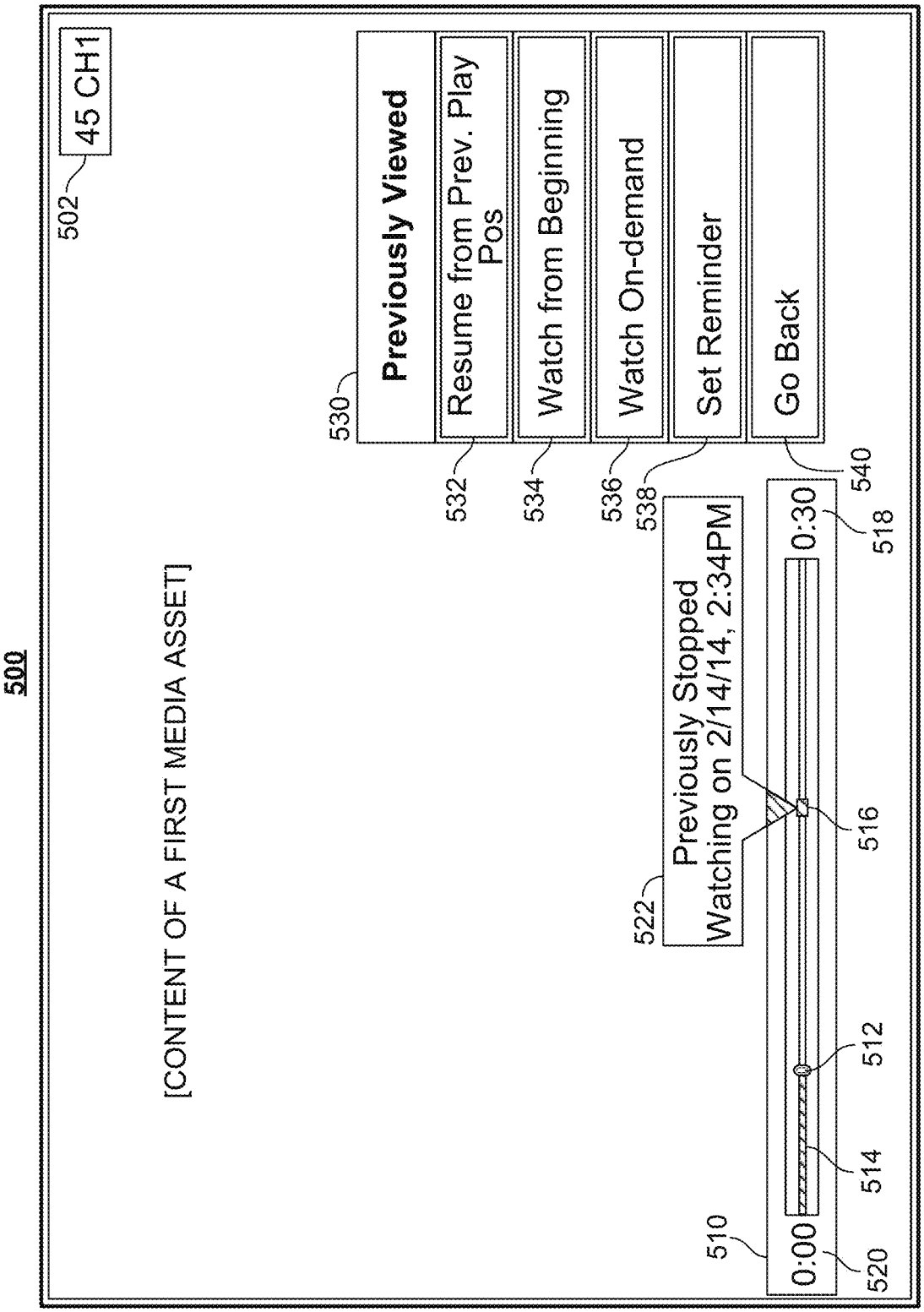
FIGS. 5 and 6 show illustrative display screens that may be used to provide media guidance in relation to previously-viewed media assets, in accordance with some embodiments of the disclosure.

FIG. 5 shows an illustrative display screen that may be used to provide media guidance in relation to previously-viewed media assets, in accordance with some embodiments of the present disclosure. As discussed in relation to FIG. 3, control circuitry 304 of user equipment device 300 may generate for display on display 312 a media asset (e.g., an episode of a TV show) in response to receiving a user selection to tune to a source that transmits one or more media assets to a plurality of users (e.g., a broadcast channel). Display screen 500 may include a transport bar 510 that visualizes whether the media asset currently being displayed has previously been viewed by the user. Display screen 500 may further contain an options menu 530 that provides a listing of media guidance functions that may be executed in relation to the previously-viewed media asset.

In some embodiments, transport bar 510 includes a start time 520 and a stop time 518 to indicate the start time and the end time of the media asset currently being generated for display on display screen 500. Start time 520 and stop time 518 may be shown in absolute terms (e.g., the time of day at which a broadcast of the media asset started). Alternatively, start time 520 and stop time 518 may be shown in relative terms, e.g., in relation to the duration of the media asset. In the latter case, start time 520 may be equal to "0:00" and stop time 518 may be equal to the duration of the media asset (e.g., "0:30" for a show that lasts 30 minutes). Similar ways of showing the start and end times of a media asset may be used without departing from the scope of the present disclosure. Transport bar 510 further includes indicator 512, which marks the current play position of the media asset, i.e., the portion of the media asset that is currently being received from the source of the media asset (e.g., the broadcast channel). The portion of the transport bar up to indicator 512 may be graphically distinguished from other parts of the transport bar in order to highlight the current play position. Transport bar 510 further includes indicator 516, which corresponds to a play position at which the user previously stopped viewing the media asset. Indicator 516 may be visually distinguished from indicator 512 by using a different type of marker to indicate the position on the transport bar or in any other suitable way. Indicator 516 may further be associated with information box 522, which may further provide additional information about when the user previously stopped viewing the media asset. For example, in some embodiments, information box 522 may include text that informs the user that the media asset has previously been viewed, and information box 522 may include the date and the time on which the media asset was last viewed. Information box 522 may be shown in proximity of indicator 516 in order to make clear the relation between information box 522 and indicator 516.

Control circuitry 304 may determine the position of indicator 512, which denotes the current play position, in several ways. In one approach, control circuitry 304 may determine the start and stop time of the media asset (e.g., an episode of a TV show) by accessing program listing information stored in a media guidance database, either locally on user equipment device 300 or on a remote server. Control circuitry 304 may use a content source identifier (e.g., the identifier of the broadcast channel, such as "ABC") to determine the start time and the stop time of the media asset currently being received from the source (e.g., a broadcast channel). Control circuitry 304 may then compare the start time and the stop time with a current system time received from a suitable component of user equipment device 300 or the remote server. In this way, control circuitry 304 may determine the amount of time that has elapsed since the transmission of the media asset by the content source began, and accordingly, the current play position relative to the start time and the stop time. In a second approach, control circuitry 304 may receive control information together with media data received from the source. The control data may include information about the position of the currently transmitted portion of the media asset relative to the start time and the stop time of the media asset, such as by including a frame number as control data. When appropriate, the first approach and the second approach may be used together, or they may be combined with other suitable techniques for determining the current play position of a media asset.

Control circuitry 304 may determine the position of indicator 516, which denotes the position at which the user previously stopped viewing the media asset by retrieving and processing an entry from the user's viewing history that corresponds to the media asset (e.g., an episode of a TV show). For example, in some embodiments control circuitry 304 may receive the matching entry from storage 308 of user equipment device 300, or control circuitry 304 may receive the matching entry from a remote server. If control circuitry 304 determines that multiple entries in the user's viewing history match a media asset identifier associated with the media asset, then either all matching entries or a subset thereof may be received by control circuitry 304. For example, in some aspects, control circuitry 304 may receive only the matching entry with a most recent "last view time field" or a matching entry that was most recently added to the viewing history. Alternatively, all matching entries for a specific time period may be retrieved, such as all matching entries in viewing history 700 that have a last watched time field within the past two months. In response to receiving a matching entry from the viewing history, control circuitry 304 may determine a first play position at which the user previously stopped viewing the identified media asset (e.g., an episode of a TV show) based on the last view time field of the viewing history. For example, as will be discussed in relation to FIG. 7, the last view time field for the first entry of viewing history 700 indicates that the first five minutes and twenty seconds of the first episode of the second season of "The Sopranos" have been watched by the user. Control circuitry 304 may then place indicator 516 according to the determined position at which the user previously stopped viewing the media asset.

Although not shown in FIG. 5, to avoid overcomplicating the drawing, more than one indicator 516 of a position at which a user previously stopped viewing the media asset may be generated for display. For example, if two or more users are watching the media asset together, each of the two or more users may have previously watched the media asset and stopped viewing it at a respective position. The positions at which each of the two or more users has previously stopped viewing the media asset may be shown using multiple indicators 516. The multiple indicators may be graphically accentuated to distinguish them from one another, and a user identifier may be generated for display next to each of the multiple indicators in order to illustrate with which of the users the indicator is associated.

Display screen 500 may further include options menu 530, which lists a number of media guidance functions that may be performed by control circuitry 304 of user equipment device 300 in relation to previously-viewed media assets. Options menu 530 may be generated for display in response to determining that the media asset (e.g., an episode of a TV show) currently being received from the source (e.g., a broadcast channel) has previously been viewed by the user, or it may be generated for display in response to control circuitry 304 receiving a selection from a user to generate options menu 530 for display. Options menu 530 may include a number of media guidance functions 532, 534, 536, and 538. Options menu 530 may be closed in response to control circuitry 304 receiving a selection of option 540 to "go back." Media guidance function listings 532-538 may be visually distinguished from one another, for example, to highlight which of media guidance function listings 532-538 are available to be executed. Depending on the position of indicators 512 and 516, only a subset of media guidance function listings 532-538 may be available to be executed by control circuitry 304 of user equipment device 300.

In some embodiments, if indicator 516 is associated with an earlier time than indicator 512, i.e., if the current play position is prior to the position at which the user previously stopped viewing the media asset, then media guidance function listings 532, 534, and 536 may be available to be executed by control circuitry 304. Media guidance function listing 532 corresponds to generating for display the media asset from a play position at which the user previously stopped viewing the media asset. As will be discussed in relation to FIG. 8, control circuitry 304 may perform this function by retrieving a stored or buffered version of the media asset, if one is available. For example, control circuitry 304 of user equipment device 300 may automatically record or buffer media assets of a selected number of sources. The recordings may be retained for a predefined amount of time or until a finite amount of capacity of storage 308 requires some content to be overwritten. If a stored or buffered version of the media asset is not available, for example because it was not recorded or because it was overwritten with other content, then media guidance function listing 532 may be omitted or it may be visually distinguished from other media guidance functions in order to make clear to the user that media guidance function listing 532 is not available to be executed.

Media guidance function listing 534 corresponds to generating for display the media asset from the beginning of the media asset. Similar to media guidance function listing 532, control circuitry 304 may perform this function by retrieving a stored or buffered version of the media asset, if one is available. If a stored or buffered version of the media asset is not available, for example because it was not recorded or because it was overwritten with other content, then media guidance function listing 534 may be omitted or it may be visually distinguished from other media guidance function listings in order to make clear to the user that media guidance function listing 534 is not available to be executed.

Media guidance function listing 536 corresponds to generating for display the media asset by retrieving it from an on-demand source. For example, if a recorded or buffered version of the media asset is not available, then media guidance function listing 536 may be an alternative that retrieves the media from a different source, e.g., a source that provides on-demand streaming of media assets (e.g., episodes of a TV show). As will be discussed in relation to FIG. 8, control circuitry 304 of user equipment device 300, in response to receiving a selection of media guidance function listing 536 from the user, may access one or more sources that provide on-demand streaming of media assets to determine whether the media asset is available for streaming. If the media asset is available for retrieval, then control circuitry 304 may generate for display the media from the position at which the user previously stopped viewing the media asset. Alternatively, if payment is required to access the media asset on-demand, control circuitry 304 may prompt the user whether to proceed by generating for display a message on display screen 500 (not shown). In response to control circuitry 304 receiving confirmation from the user to proceed with the purchase of the media asset, control circuitry 304 may generate for display the media asset (e.g., the episode of the TV show) from the position at which the user previously stopped viewing the media asset. Alternatively, control circuitry 304 may generate for display the media asset from the beginning instead of from the position at which the user previously stopped viewing the media asset. In some embodiments, control circuitry 304 may determine, prior to media guidance function listing 536 being selected by the user, whether the media asset is available from an on-demand source. Depending on the determination, media guidance function 536 may be visually distinguished, for example by altering a shading of media guidance function listing 536. In this way, the user may be informed as to whether the media asset is available to be generated for display on demand, prior to control circuitry 304 receiving a selection of media guidance function listing 536 from the user.

In some embodiments, if indicator 516 is associated with a later time than indicator 512, i.e., if the current play position is after the position at which the user previously stopped viewing the media asset, then media guidance function listings 536 and 538 may be available to be executed by control circuitry 304 of user equipment device 300. Media guidance function listing 536 corresponds to generating for display the media asset by retrieving it from an on-demand source, and media guidance function listing 536 may be executed in a substantially similar way as discussed in relation to the embodiment in which indicator 516 is associated with a time prior to indicator 512. Media guidance function listing 538 corresponds to reminding the user when the current play position (e.g., a current broadcast position) reaches the position at which the user previously stopped viewing the media asset, i.e., the time at which indicator 512 reached indicator 516. Media guidance function listing 538 may be executed by control circuitry 304 receiving a selection of media guidance function listing 538 from the user. In response to the selection, control circuitry 304 may enable the user to switch to a different content source (e.g., to tune to a different broadcast channel) in order to watch other media assets, to browse for other content in the media guide, or to invoke other applications of the media guidance application. At the same time, control circuitry 304 monitors the current play position (e.g., the current broadcast position) of the media asset to determine when the current play position reaches the position at which the user previously stopped viewing the media asset. When control circuitry 304 determines that the current play position has reached the position at which the user previously stopped viewing the media asset, control circuitry 304 may automatically tune to the source of the media asset (e.g., the broadcast channel from which the media asset is being received). Alternatively or additionally, a reminder may be generated for display that informs the user that the current play position has reached the position at which the user previously stopped viewing the media asset.

Figure 6:
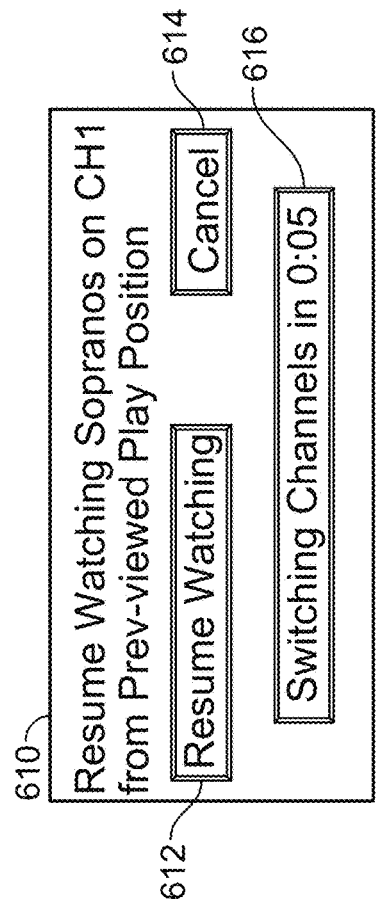

FIG. 6 shows illustrative display screen 600 that may be used to provide media guidance in relation to previously-viewed media assets, in accordance with some embodiments of the disclosure. As discussed in relation to FIG. 3, control circuitry 304 may generate for display on display 312 a media asset in response to receiving a user selection to tune to a source that transmits one or more media assets to a plurality of users (e.g., a broadcast channel). Display screen 600 includes a display of a different media asset than display screen 500 because display screen 600 corresponds to a different source (e.g., a different broadcast channel) than display screen 500. Display screen 600 may include a notification box 610 that is generated for display in relation to media guidance function listing 538. In particular, the execution of media guidance function listing 538 may have been started in response to control circuitry 304 receiving a user selection of media guidance function listing 538 in relation to another media asset shown on a different channel.

Notification box 610 may include text that identifies the media asset and the channel for which media guidance function 538 was invoked. For example, if control circuitry 304 executed media guidance function listing 538 in response to receiving a user selection of media guidance function listing 538 while an episode of "The Sopranos" was being generated for display on channel "CH1," then notification box 610 may alert the user that the current play position (e.g., the current broadcast position) of The Sopranos on channel CH1 has reached the position at which the user previously stopped viewing by prompting the user whether to "resume watching The Sopranos on CH1 from the previously-viewed play position" or a similar text. Notification box 610 may further include several selectable buttons. For example, in response to control circuitry 304 receiving a selection of button 612, control circuitry 304 may automatically switch to the source transmitting the media asset for which media guidance function listing 538 was executed (e.g., the broadcast channel for which media guidance function listing 538 was executed). Alternatively, in response to control circuitry 304 receiving a selection of button 614, media guidance function 538 may be canceled and control circuitry 304 may continue to display the content source currently being accessed (e.g., the broadcast channel being shown in display screen 600), instead of switching to the channel in relation to which media guidance function listing 538 was executed. In some embodiments, information box 610 may comprise a countdown 616. Upon expiration of a predefined time period, control circuitry 304 may automatically switch the channel to display the media asset for which media guidance function listing 538 was executed.

FIG. 7 shows an illustrative viewing history 700 that stores play positions at which a user previously stopped viewing a media asset (e.g., a movie or an episode of a TV show), in accordance with some embodiments of the disclosure. Viewing history 700 includes various information associated with media assets that have previously been viewed by a user. For example, viewing history 700 may include a program name of the media asset, an episode identifier (if applicable), a play position at which the user previously stopped viewing the media asset, and a user identifier. The program name may correspond to the title of the media asset (e.g., the title of a movie, the title of a series, or any other suitable text to identify the media asset). For example, in some embodiments, the program name in viewing history 700 may be the same as the program listing of the media asset in the media guidance application. Viewing history 700 may further include an episode field that includes an identifier of the season and episode for a media asset that belongs to a series. The episode field of viewing history 700 may be left empty for media assets that do not belong to a series. Viewing history 700 may further include a user identifier that identifies the user with whom the entry in the viewing history is associated. For example, the user identifier may identify a user by his or her first name, which may be suitable if viewing history 700 is stored locally in user equipment device 300 (e.g., in storage 308) or if the user identifier need only differentiate a small number of users who have access to user equipment device 300 (e.g., the members of a family). Alternatively, user identifier may correspond to a globally unique identifier such as an email address, a user name, a nickname, or any other suitable identifier. A globally unique identifier may be useful if a large number of users needs to be differentiated, such as when viewing history 700 is stored on a remote server that provides service to a large number of users.

Viewing history 700 may be defined using one or more data structures and stored using any suitable database format. In some aspects, if viewing history 700 is stored locally on user equipment device 300, control circuitry 304 may retrieve one or more entries of viewing history 700 by directly searching one or more files that contain viewing history 700 (e.g., in form of a text file), or by issuing a query to a locally stored database. If viewing history 700 is stored on a remote server, control circuitry 304 may issue a query to the remotely stored database. In some aspects, the format of the database query may be in accordance with a standardized format, such as using the Structured Query Language (SQL). Based on such a standardized query format, control circuitry 304 may efficiently access viewing history 700, which may be particularly important if viewing history 700 is shared among many users and therefore large in size. For example, control circuitry 304 may access viewing history 700 based on a query that combines multiple fields of the using history, such as the user identifier, the title field, and the episode field. In some embodiments, by including a number of fields in the query, the database may be searched more effectively. In response to receiving a search query from control circuitry 304, the remote server may identify entries in viewing history 700 that match the search queries. Control circuitry 304 may then receive the matching entries from the remote server.

In some embodiments, viewing history 700 may be stored automatically by control circuitry 304. For example, every time a user accessed a media asset (e.g., an episode of a TV show), control circuitry 304 may generate a listing in viewing history 700. In some aspects, control circuitry 304 may generate a listing only when a media asset is accessed for longer than a predetermined time. For example, if a media asset is accessed for only a few seconds, no listing in viewing history 700 may be generated. This avoids that entries are generated when a user is merely "channel surfing" to identify content to watch. In another embodiment, if more than a predetermined fraction of a media asset has been accessed by the user (e.g., more than 95% of the media asset has been watched), the media asset may be marked as having been fully viewed in viewing history 700. This avoids that media assets are listed as partially viewed, e.g., when a user stops a media asset to avoid viewing the credits of a movie.

Figure 8A:
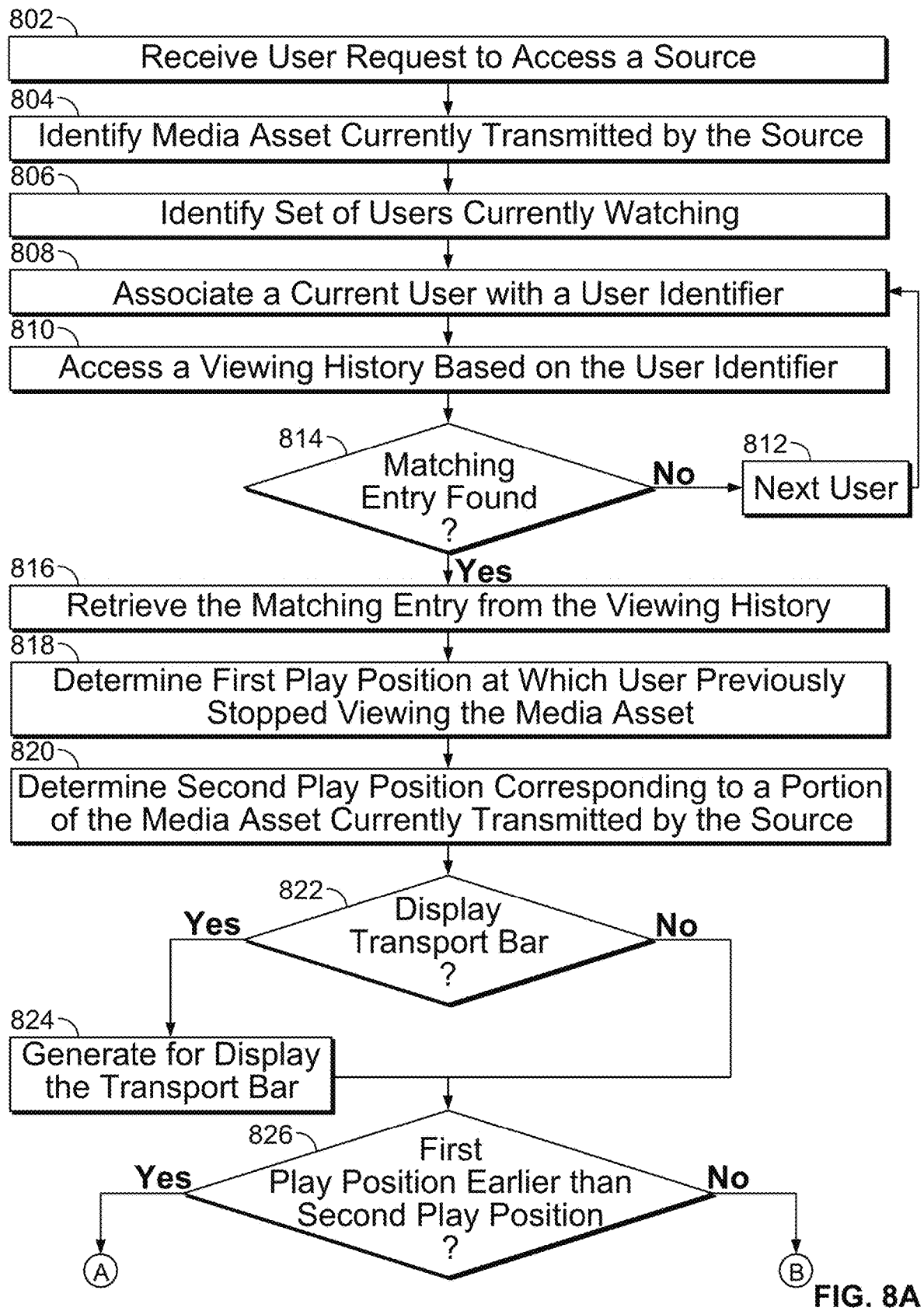
FIG. 8A shows a flow chart of illustrative steps involved in providing media guidance in relation to previously-viewed media assets, in accordance with some embodiments of the disclosure.

FIG. 8A is a flow chart of illustrative steps involved in providing media guidance in relation to previously viewed media assets, in accordance with some embodiments of the disclosure. At step 802, control circuitry 304 of user equipment device 300 receives a user request to access a content source (e.g., a broadcast channel). For example, a user may tune to a broadcast channel that is currently airing a media asset (e.g., an episode of a TV show).

At step 804, in response to receiving the user request, control circuitry 304 of user equipment device 300 identifies the media asset (e.g., an episode of a TV show) currently being transmitted by the content source (e.g., the broadcast channel). In some embodiments, control circuitry 304 identifies the media asset by determining the current system time and an identifier of the content source (e.g., an identifier of the broadcast channel, such as "ABC"). Control circuitry 304 may determine the current system time and the content source identifier by reading it from storage 308 or by retrieving it from another suitable component of user equipment device 300. Based on the system time and the content source identifier, control circuitry 304 may access a media guidance database, stored locally on storage 308 or remotely on a remote server. Control circuitry 304 retrieves a program listing from the media guidance database corresponding to the current system time and the content source identifier. Alternatively or additionally, control circuitry 304 may receive the content source identifier directly from the content source or from a third party source independently of the media guidance application.

At step 806, control circuitry 304 may identify a set of users currently watching or using user equipment device 300. Control circuitry 304 may identify the set of users using a number of suitable ways. In one approach, control circuitry 306 may generate a display on screen 312 of user equipment device 300 that prompts users to input a user identifier, such as a user name, a screen name, a login name, or any other suitable identifier. More than one user identifier may be received by control circuitry 304 in case that more than one user is watching or using user equipment device 300. In a second approach, control circuitry 304 may determine the set of users currently watching or using user equipment device 300 by receiving an input from a remote control unit. For example, control circuitry 304 may receive an input from each user currently watching or using user equipment device 300, such as each user pressing one or more designated buttons on a remote control. Control circuitry 304 may then associate the input received from each user with respective user identifiers. In a third approach, each user in the set of users may wear or have implanted electronic circuitry, such as a microchip, radio-frequency identification (RFID) circuit, or similar electronic circuitry. Control circuitry 304 may cause radio frequency circuitry of user equipment device 300 to periodically look for such electronic circuitry and, when found, associate them with respective user identifiers. In some embodiments, control circuitry 304 may use a combination of these three approaches, or combine them with other suitable techniques, to identify the set of users currently watching or using user equipment device 300.

At step 808, in response to identifying the set of users currently watching or using user equipment device 300, control circuitry 304 may associate one or more user identifiers with the set of users currently watching or using user equipment device 300. The user identifiers associated with the set of users may be employed by control circuitry 304 to access a viewing history for each user in the set of users. In some embodiments, for example, if viewing histories of each user in the set of users are stored locally on storage 308 of user equipment device 300, it may not be necessary to associate a separate identifier with each user in the set of users. Instead, it may suffice to access the locally stored viewing history using the user identifiers determined in step 806 above. In other embodiments, especially if viewing histories for the set of users are stored remotely, for example, on a remote server, then control circuitry 304 may need to convert the local user identifier to user identifiers that specifically identify a user on the remote server. For example, in order for the remote server to specifically identify a user, the user's email address, phone number, first and last name, address, social security number, or any other suitable personal identifier may be used. Although not shown in FIG. 8A, control circuitry 304 or the remote server may assign identifiers to a group of users, such as a family watching or using user equipment device 300 together. Alternatively or additionally, control circuitry 304 may group users according to the users' preferences or other factors (e.g., parents and children may constitute different groups of users).

At step 810, control circuitry 304 of user equipment device 300 may access a viewing history using the user identifiers determined at step 808. In some embodiments, the viewing history may be stored locally in user equipment device 300, such as in storage 308. In other embodiments, the viewing history may be stored remotely at a remote server, such as in a database stored in media guidance data source 418. The viewing history may also be stored partially on user equipment device 300 and partially on a remote server.

As discussed in relation to FIG. 7, viewing history 700 may include a plurality of fields, such as a program name field, an episode field, a last view time field, a user identifier field, and any other suitable types of fields. The program name field may include text that identifies the media asset, such as its title (e.g., the title of a TV show, such as "The Sopranos"). The episode field may be used by control circuitry 304 to provide further identifying information for series content, such as season and episode number (e.g., Season 2, Episode 1 of "The Sopranos"). The last view time field may include the position, relative to the beginning of the media asset (e.g., an episode of a TV show), at which the user previously stopped viewing the media asset. In some aspects, control circuitry 304 may encode the position at which the user previously stopped viewing the media asset in a different format, for example, in terms of a percentage of the media asset watched (e.g., 30% of the media asset have been watched), in terms of a frame number (e.g., 500 frames of the media asset have been watched), or using any other suitable metric. User ID field may be used by control circuitry 304 to specifically identify a user to whom an entry in the viewing history belongs. For example, as is discussed in relation to FIG. 7, an entry of the viewing history may have a program name field equal to "The Sopranos" to denote the TV show with the same name, an episode field equal to "Season 2, Episode 1" to denote a corresponding episode, a last view time field equal to "5:20" to denote that five minutes and twenty seconds of the "The Sopranos" episode have been watched, and a user identifier field equal to "John" that specifically identifies user "John" by his first name. In some aspects, although not shown in FIG. 7, viewing history 700 may further include fields that represent the date and time at which a user has last watched the media asset. For example, a last watched field may indicate that a user has previously viewed a portion of the media asset on a specific date and time (e.g., on Feb. 14, 2014 at 2:34 PM).

At step 814, control circuitry 304 of user equipment device 300 may determine whether viewing history 700 contains at least one matching entry for the identified media asset and the identified user identifier. If control circuitry 304 determines that no matching entry is contained in viewing history 700, then control circuitry 304 may proceed by performing steps 808, 810, and 814 for another user, i.e., by associating a next user in the set of users with a respective user identifier.

In response to control circuitry 304 determining that a matching entry has been found in viewing history 700 at step 814, control circuitry 304 may retrieve the matching entry from viewing history 700. For example, in some embodiments control circuitry 304 may receive the matching entry from storage 308 of user equipment device 300, or control circuitry 304 may receive the matching entry from a remote server. If control circuitry 304 determines that multiple entries in viewing history 700 match the media asset identifier and the identified user identifier, then either all matching entries or a subset thereof may be received by control circuitry 304. For example, in some aspects, control circuitry 304 may receive only the matching entry with the most recent "last watch time field" or the matching entry that was most recently added to viewing history 700. Alternatively, all matching entries for a specific time period may be retrieved, such as all matching entries in viewing history 700 that have a last watched time field within the past two months.

Control circuitry 304 may retrieve matching entries from viewing history 700 in a number of ways. For example, if viewing history 700 is stored locally on user equipment device 300, control circuitry 304 may retrieve one or more entries of viewing history 700 by directly searching one or more files that contain viewing history 700 (e.g., in form of a text file), or by issuing a query to a locally stored database. If viewing history 700 is stored on a remote server, control circuitry 304 may issue a query to the remotely stored database. In some aspects, the format of the database query may be in accordance with a standardized format, such as using the Structured Query Language (SQL). Based on such a standardized query format, control circuitry 304 may efficiently access viewing history 700, which may be particularly important if viewing history 700 is shared among many users and therefore large in size. For example, control circuitry 304 may access viewing history 700 based on a query that combines multiple fields of the using history, such as the user identifier, the title field, and the episode field. In some embodiments, by including a number of fields in the query, the database may be searched more effectively. In response to receiving a search query from control circuitry 304, the remote server may identify entries in viewing history 700 that match the search queries. Control circuitry 304 may then receive the matching entries from the remote server.

At step 818, in response to receiving a matching entry from viewing history 700, control circuitry 304 may determine a first play position at which the user previously stopped viewing the identified media asset (e.g., an episode of a TV show) based on the last view time field of viewing history 700. For example, as discussed in relation to FIG. 7, the last view time field for the first entry of viewing history 700, indicates that the first five minutes and twenty seconds of the first episode of the second season of "The Sopranos" have been watched by the user.

At step 820, control circuitry 304 may determine a second play position corresponding to a portion of the media asset currently being transmitted by the source (e.g., a broadcast channel). In some embodiments, the second play position may also be referred to a current play position. Control circuitry 304 may determine the current play position in several ways. In one approach, control circuitry 304 may determine the start and stop time of the media asset (e.g., an episode of a TV show) by accessing program listing information stored in a media guidance database, either locally on user equipment device 300 or on a remote server. Control circuitry 304 may use a content source identifier (e.g., the identifier of the broadcast channel, such as "ABC") to determine the start time and the stop time of the media asset currently being received from the source (e.g., a broadcast channel). Control circuitry 304 may then compare the start time and the stop time with a current system time received from a suitable component of user equipment device 300 or the remote server. In this way, control circuitry 304 may determine the amount of time that has elapsed since the transmission of the media asset by the content source began, and accordingly, the current play position relative to the start time and the stop time. In a second approach, control circuitry 304 may receive control information together with media data received from the source. The control data may include information about the position of the currently transmitted portion of the media asset relative to the start time and the stop time of the media asset, such as by including a frame number as control data. When appropriate, the first approach and the second approach may be used together, or they may be combined with other suitable techniques for determining the current play position of a media asset.

At step 822, control circuitry 304 may determine whether a transport bar including the first and the second play position should be generated for display. In some embodiments, control circuitry 304 may make this determination based on a user profile setting, such as a setting that indicates whether transport bar 510 should be generated for display automatically, without receiving an input from the user, or whether transport bar 510 should be generated for display only after receiving respective input from the user. In the latter case, the user may be presented with a message by control circuitry 304, such as a message informing the user that the media asset has previously been viewed and that a position corresponding to the time at which the user previously stopped viewing the media asset may be generated for display. Control circuitry 304 may inform the user by generating for display a visual indicator, such as an icon, or by generating for display a message that includes suitable information.

In response to control circuitry 304 determining that transport bar 510 should be generated for display, control circuitry 304 may generate for display the transport bar at step 824. As discussed in relation to FIG. 5, transport bar 510 may visualize whether the media asset currently being displayed has previously been viewed by the user. Transport bar 510 includes a start time 520 and a stop time 518 to indicate the start time and the end time of the media asset currently being generated for display. Transport bar 510 further includes indicator 512, which marks the current play position of the media asset, i.e., the portion of the media asset that is currently being received from the source of the media asset (e.g., the broadcast channel). The portion of the transport bar up to indicator 512 may be graphically distinguished from other parts of the transport bar in order to highlight the current play position. Transport bar 510 further includes indicator 516, which corresponds to a play position at which the user previously stopped viewing the media asset. Indicator 516 may be visually distinguished from indicator 512 by using a different type of marker to indicate the position on the transport bar or in any other suitable way. Indicator 516 may further be associated with information box 522, which may provide additional information about when the user previously stopped viewing the media asset. For example, in some embodiments, information box 522 may include text that informs the user that the media asset has previously been viewed, and information box 522 may include the date and the time on which the media asset was last viewed. Information box 522 may be shown in proximity of indicator 516 in order to make clear the relation between information box 522 and indicator 516.

In some aspects, only a subset of the components of transport bar 510 may be generated for display, or transport bar 510 may be augmented with other suitable components to visually distinguish the first and second play positions of the media asset (e.g., an episode of a TV show). Alternatively, should control circuitry 304 determine that transport bar 510 should not be generated for display, step 824 may be skipped and control circuitry 304 may proceed to process step 826.

At step 826, control circuitry 304 of user equipment device 300 may determine if the first play position corresponds to an earlier time than the second play position. If control circuitry 304 determines that the first play position corresponds to an earlier time than the second play position, control circuitry 304 may resume processing at point "A" in FIG. 8B. Otherwise, control circuitry 304 may resume processing at point "B" in FIG. 8C. In some embodiments, if multiple matching entries were identified in the viewing history, control circuitry 304 may determine multiple first play positions for each of the matching entries and may compare each of the more than one first play positions with the second play position. Control circuitry 304 may further receive input from the user that selects one of the multiple first play positions. Control circuitry 304 may thus determine with respect to which of the multiple first play positions, at which the user previously stopped viewing the media asset, a media guidance function should be executed.

Figure 8B:
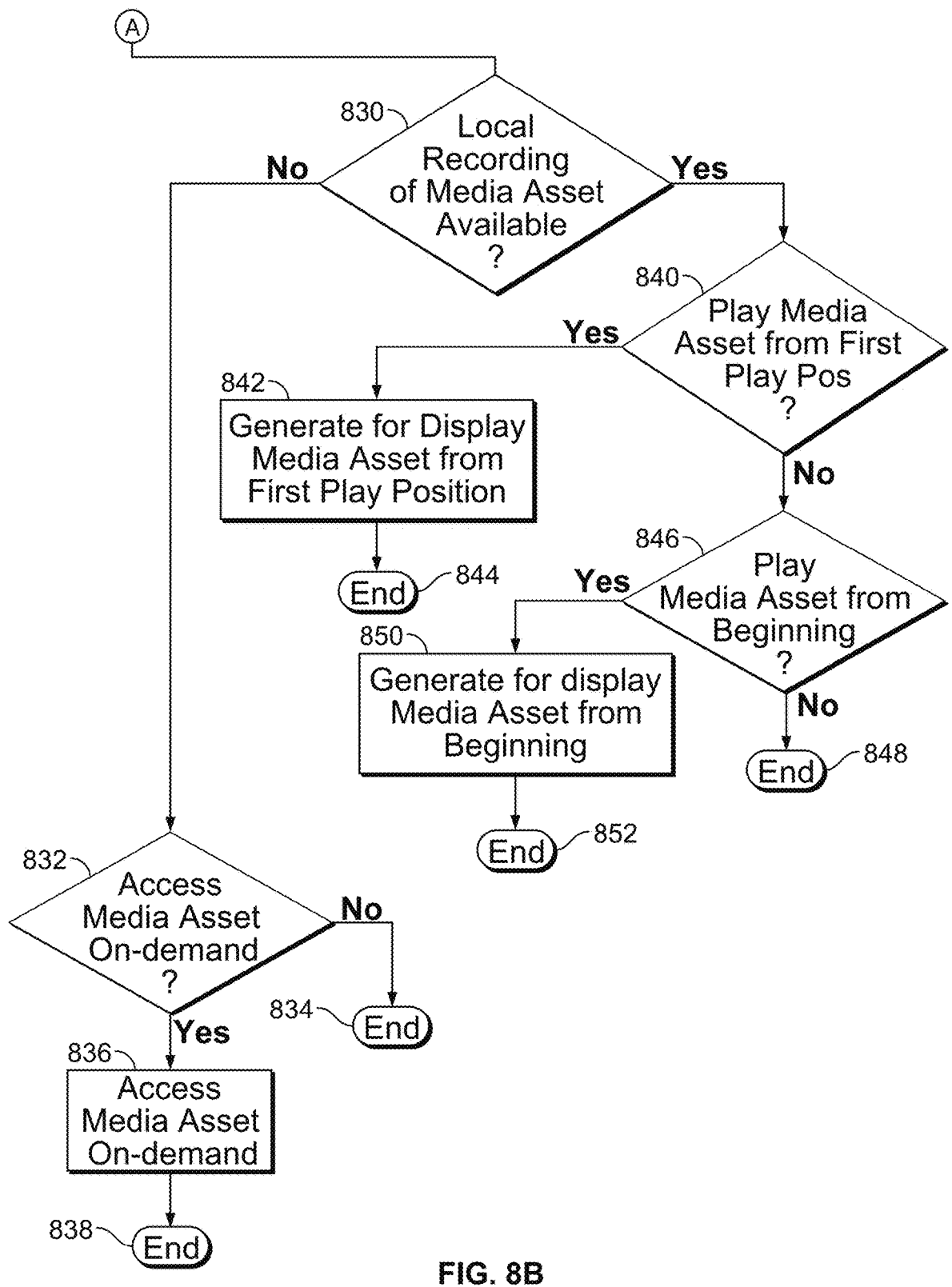
FIG. 8B shows a flow chart of illustrative steps involved in providing media guidance in relation to previously-viewed media assets when a current viewing position occurs later than a position at which the user previously stopped viewing the media asset, in accordance with some embodiments of the disclosure.

FIG. 8B shows illustrative steps involved in providing media guidance in relation to previously-viewed media assets when a current viewing position occurs earlier than a position at which the user previously stopped viewing the media asset, in accordance with some embodiments of the present disclosure.

At step 830, control circuitry 304 of user equipment device 300 may determine if a local recording of the media asset (e.g., an episode of a TV show) is available to be accessed from a storage medium. In some embodiments, control circuitry 304 may determine whether a recording of the media asset is available by searching local storage components of user equipment device 300, such as storage 308. In other embodiments, storage on a remote server may be included in the search, for example, if such remote storage is accessible to control circuitry 304 without having to purchase access to a stored copy of the media asset. For example, in some embodiments, a user may have purchased rights to view or download media assets previously, but the media assets may be stored on a remote server (e.g., in an "app store") of a remote server. In some aspects, control circuitry 304 may search for a stored version of the media asset (e.g., an episode of a TV show) by searching metadata associated with stored media assets, such as file names of stored media files, or metadata otherwise associated with content stored on local or remote storage media. In some aspects, if a search result is identified, control circuitry 304 may generate a display of the search results on display 312 and receive a user confirmation if at least one of the search results is deemed satisfactory by the user. For example, if multiple versions of a media asset are stored (e.g., an edited and an unedited version of the same movie), control circuitry 304 may prompt the user to select which of the versions should be selected.

If control circuitry 304 determines that a local recording of the media asset (e.g., an episode of a TV show) is available, control circuitry 304 may prompt the user whether to display the media asset from the first play position, i.e., from the position at which the user previously stopped viewing the media asset. In response to control circuitry 304 receiving an indication that the user wants the media asset to be generated for display from that position, control circuitry 304 may then generate for display the media asset from the position at which the user previously stopped viewing the media asset.

Alternatively, if control circuitry 304 receives an indication that the user does not want to generate for display the media asset from the position at which the user previously stopped viewing the media asset, control circuitry 304 may prompt the user whether to generate for display the media asset from the beginning. Responsive to control circuitry 304 receiving an indication that the user wants to generate for display the media asset from the beginning, control circuitry 304 may then generate for display the media asset from the beginning.

Alternatively, if control circuitry 304 determines at step 830 that no local recording of the media asset is available, control circuitry 304 may determine, at step 832, whether the media asset (e.g., an episode of a TV show) can be accessed on-demand. Control circuitry 304 may determine if the media asset can be accessed on-demand, by searching a number of on-demand content providers (e.g., Netflix, Amazon, Hulu, etc.) for matching media asset listings. If control circuitry 304 determines that there are a number of matching media asset listings, either from the same or from multiple content providers, control circuitry 304 may generate a display of the matching entry or entries and prompt the user to select which of the multiple media asset listings should be chosen. The media asset listings that control circuitry 304 generates for display may include purchase information in case payment is required to access the listed media asset on-demand. For example, if the media asset is available on-demand from multiple content providers, the cost of the media asset may differ between the providers. Control circuitry 304 thereby enables the user to compare prices among content providers and select the listing that is most appealing to the user. The purchase information generated for display by control circuitry 304 may further include whether a media asset is available as part of a user's subscription to an on-demand content provider free of charge.

In response to control circuitry 304 determining that the media asset is available to be accessed on-demand, control circuitry 304 may generate for display an indication in options menu 530 that media guidance function listing 536 is available to be selected. In response to a user command, control circuitry 304 may access the media asset on-demand and generate for display the media asset (e.g., an episode of a TV show). In one aspect, the media asset may be streamed to user equipment 300 from a remote server, and control circuitry 304 may generate for display the media asset. For example, control circuitry 304 may generate for display the media asset from the position at which the user previously stopped viewing the media asset. Alternatively, control circuitry 304 may generate for display the media asset from the beginning, in response to receiving a respective user indication.

Figure 8C:
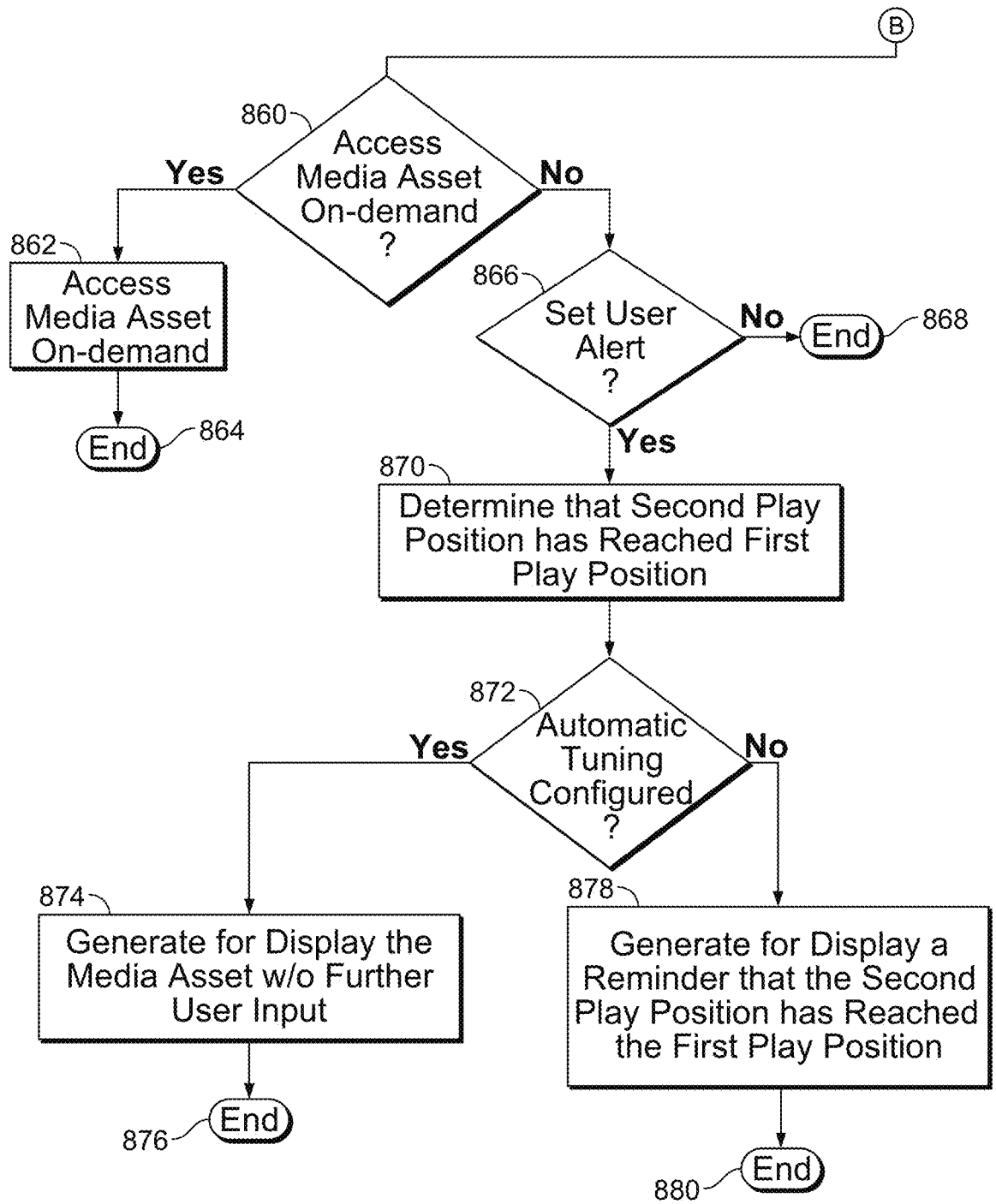
FIG. 8C shows a flow chart of illustrative steps involved in providing media guidance in relation to previously-viewed media assets when a current viewing position occurs earlier than a position at which the user previously stopped viewing the media asset, in accordance with some embodiments of the disclosure.

FIG. 8C shows illustrative steps involved in providing media guidance in relation to previously-viewed media assets when a current viewing position occurs earlier than a position at which the user previously stopped viewing the media asset, in accordance with some embodiments of the disclosure.

In some embodiments, because the current play position occurs earlier than the position at which the user previously stopped viewing the media asset, the portions of the media asset between the current play position and the position at which the user previously stopped viewing the media asset may not have been automatically buffered by control circuitry 304 and a local recording of these portions may thus not be available to control circuitry 304. Accordingly, at step 860, control circuitry 304 may determine whether the media asset is available to be accessed on-demand. Similar to step 832, control circuitry 304 may determine if the media asset is available to be accessed on-demand by searching a number of on-demand content providers for matching media asset listings. If control circuitry 304 determines that there are a number of matching media asset listings, either from the same or from multiple content providers, control circuitry 304 may generate a display of the matching entries and prompt the user to select which of the multiple media asset listings should be chosen. In response to the user selection, control circuitry 304 may generate for display the selected on-demand media asset listing for display. In one aspect, the selected on-demand media asset (e.g., an episode of a TV show) may be generated for display from the position at which the user previously stopped viewing the media asset. Alternatively, control circuitry 304 may generate for display the media asset from the beginning, responsive to receiving a respective user selection.

Alternatively, if control circuitry 304 determines at step 860 that the media asset is not available to be accessed on demand, control circuitry 304 may keep monitoring the current play position (e.g., the current broadcast position) to execute a media guidance function once the current play position reaches the position at which the user previously stopped viewing the media asset. For example, in some aspects, control circuitry 304, at step 866, may prompt the user whether to set a user alert, such that control circuitry 304 alerts the user once the current play position has reached the position at which the user previously stopped viewing the media asset, e.g., by generating for display a dialog box. Responsive to receiving a user indication to set a user alert, control circuitry 304 monitors the current play position until control circuitry 304 determines, at step 870, that the current play position has reached the position at which the user previously stopped viewing the media asset.

In response to determining that the current play position has reached the position at which the user previously stopped viewing the media asset, control circuitry 304 may determine, at step 872, whether it should automatically tune to the source on which the media asset is being received (e.g., the broadcast channel). For example, in some aspects, after having received a user instruction to set a user alert, at step 866, control circuitry 304 may receive a user instruction to access a different source (e.g., to tune to a different broadcast channel), while the previously watched content is being received from the source. For example, to avoid watching the previously-seen content again, control circuitry 304 may receive a user instruction to generate for display another media asset from a different source (e.g., the different broadcast channel). If control circuitry 304 determines, at step 872, that automatic tuning is configured, control circuitry 304 automatically, without further user input, selects the source from which the media asset is being received and generates it for display, at step 874, from the position at which the user previously stopped viewing the media asset. Alternatively, if control circuitry 304 determines that automatic tuning is not configured, control circuitry 304 generates for display a reminder that the current play position (e.g., the current broadcast position) has reached the position at which the user previously stopped viewing the media asset. In some embodiments, the reminder may be similar to notification box 610. Responsive to generating for display the reminder, control circuitry 304 may receive a user instruction to switch to the source of the media asset (e.g., the broadcast channel). Alternatively, control circuitry 304 may cancel the reminder, in response to receiving a respective user instruction, for example, if the user is no longer interested in watching the media asset.

It is contemplated that the steps or descriptions of FIGS. 8A-8C may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIGS. 8A-8C.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method comprising:
   accessing a viewing history associated with a user profile;
   identifying, based on the viewing history, a first position within a media asset at which the user profile previously stopped viewing the media asset;
   receiving, from a user device associated with the user profile, a request to access a first broadcast source by which the media asset is currently being transmitted;
   accessing the first broadcast source by which the media asset is currently being transmitted to identify broadcast information for the media asset;
   determining a second position within the media asset based on the broadcast information, the second position corresponding to a current broadcast position of the media asset;
   based on determining that the second position is after the first position within the media asset, searching a second on-demand source for the media asset based on determining that buffered data for the media asset at the user device is insufficient to resume playback of the media asset from the first position within the media asset; and
   providing, at the user device, the media asset from the second on-demand source.

2. The method of claim 1, wherein the first broadcast source corresponds to a broadcast channel; and
   wherein the searching the second on-demand source for the media asset comprises accessing a media asset database to retrieve the media asset from an on-demand source.

3. The method of claim 1, wherein the viewing history comprises viewing information for a plurality of user profiles and the viewing history is accessed using an identifier associated with one user profile of the plurality of user profiles.

4. The method of claim 1, wherein identifying, based on the viewing history, the first position within the media asset at which the user profile previously stopped viewing the media asset further comprises identifying, within the viewing history associated with the media asset, an entry comprising at least one of a date and time when the media asset was last played.

5. The method of claim 1, wherein the first position within the media asset and the second position within the media asset correspond to respective playback times within the media asset.

6. The method of claim 1, wherein the second on-demand source corresponds to a content provider.

7. The method of claim 1, further comprising:
   receiving a selection from the user device to access the media asset on-demand, wherein the providing, at the user device, the media asset from the second on-demand source is based on receiving the selection.

8. The method of claim 1, wherein the searching the second on-demand source for the media asset further comprises searching the second on-demand source for a media listing corresponding to the media asset.

9. The method of claim 1, wherein providing, on the user device, the media asset from the second on-demand source is based on receiving a selection, from the user device, to resume playback of the media asset from the first position within the media asset.

10. A system comprising:
    storage circuitry configured to store a viewing history associated with a user profile, the viewing history comprising identifying information of media assets previously viewed by the user profile and last play positions for each of the previously viewed media assets; and
    control circuitry configured to:
    access the viewing history associated with the user profile;
    identify, based on the viewing history, a first position within a media asset at which the user profile previously stopped viewing the media asset;

receive, from a user device associated with the user profile, a request to access a first broadcast source by which the media asset is currently being transmitted;

access the first broadcast source by which the media asset is currently being transmitted to identify broadcast information for the media asset;

determine a second position within the media asset based on the broadcast information, the second position corresponding to a current broadcast position of the media asset;

based on determining that the second position is after the first position within the media asset, search a second on-demand source for the media asset based on determining that buffered data for the media asset at the user device is insufficient to resume playback of the media asset from the first position within the media asset; and provide, at the user device, the media asset from the second on-demand source.

11. The system of claim 10, wherein the first broadcast source corresponds to a broadcast channel; and wherein the control circuitry is configured to search the second on-demand source for the media asset by accessing a media asset database to retrieve the media asset from an on-demand source.

12. The system of claim 10, wherein the viewing history comprises viewing information for a plurality of user profiles and the viewing history is accessed using an identifier associated with one user profile of the plurality of user profiles.

13. The system of claim 10, wherein the control circuitry is configured to identify, based on the viewing history, the first position within the media asset at which the user profile previously stopped viewing the media asset by identifying, within the viewing history associated with the media asset, an entry comprising at least one of a date and time when the media asset was last played.

14. The system of claim 10, wherein the first position within the media asset and the second position within the media asset correspond to respective playback times within the media asset.

15. The system of claim 10, wherein the second on-demand source corresponds to a content provider.

16. The system of claim 10, wherein the control circuitry is further configured to:

receive a selection from the user device to access the media asset on-demand; and provide, at the user device, the media asset from the second on-demand source based on receiving the selection.

17. The system of claim 10, wherein the control circuitry is configured to search the second on-demand source for the media asset by searching the second on-demand source for a media listing corresponding to the media asset.

18. The system of claim 10, wherein the control circuitry is configured to provide, on the user device, the media asset from the second on-demand source based on receiving a selection, from the user device, to resume playback of the media asset from the first position within the media asset.

* * * * *